United States Patent
Cho et al.

(10) Patent No.: US 10,508,736 B2
(45) Date of Patent: Dec. 17, 2019

(54) UPSHIFT CONTROL METHOD FOR DCT VEHICLE

(71) Applicants: HYUNDAI MOTOR COMPANY, Seoul (KR); KIA MOTORS CORPORATION, Seoul (KR)

(72) Inventors: Sung Hyun Cho, Yongin-si (KR); Dong Hyup Kang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 101 days.

(21) Appl. No.: 15/984,978

(22) Filed: May 21, 2018

(65) Prior Publication Data
US 2019/0170250 A1    Jun. 6, 2019

(30) Foreign Application Priority Data
Dec. 6, 2017    (KR) .................... 10-2017-0166340

(51) Int. Cl.
*F16H 61/688*    (2006.01)
*F16H 59/18*    (2006.01)
*F16H 59/48*    (2006.01)

(52) U.S. Cl.
CPC ... *F16H 61/688* (2013.01); *F16D 2500/3065* (2013.01); *F16D 2500/30412* (2013.01); *F16D 2500/70426* (2013.01); *F16H 59/18* (2013.01); *F16H 59/48* (2013.01)

(58) Field of Classification Search
USPC ............................................. 701/50
See application file for complete search history.

(56) References Cited

U.S. PATENT DOCUMENTS

| | | | |
|---|---|---|---|
| 9,140,359 B2 * | 9/2015 | Porto | F16H 61/688 |
| 9,822,875 B2 * | 11/2017 | Cho | F16H 63/46 |
| 9,835,210 B2 * | 12/2017 | Cho | F16D 48/068 |
| 10,316,957 B2 * | 6/2019 | Cho | F16H 61/0403 |
| 2018/0320784 A1 * | 11/2018 | Lampe | F16H 61/686 |

FOREIGN PATENT DOCUMENTS

| | | |
|---|---|---|
| KR | 10-1510015 B1 | 4/2015 |
| KR | 10-2015-0134501 A | 12/2015 |
| KR | 10-2016-0053327 A | 5/2016 |
| KR | 10-1673696 B1 | 11/2016 |

\* cited by examiner

*Primary Examiner* — Dirk Wright
(74) *Attorney, Agent, or Firm* — Brinks Gilson & Lione

(57) ABSTRACT

An upshift control method for a dual clutch transmission (DCT) for a vehicle includes: determining, by a controller, whether or not an inertia phase begins when a driver accelerator pedal depression amount increases during power-on upshifting; calculating, by the controller, a first control amount, which is a first final clutch torque for controlling an engaging clutch, when the inner phase begins, in consideration of a difference between a current accelerator pedal depression amount and an accelerator pedal depression amount at beginning of the inertia phase, a difference between the current accelerator pedal depression amount and a maximum value of an accelerator pedal depression amount during the inertia phase elapsed until a present time, and a target engine torque, and controlling, by the controller, the engaging clutch with the final clutch torque calculated in the calculating.

7 Claims, 3 Drawing Sheets

UPSHIFT CONTROL METHOD FOR DCT VEHICLE

CROSS-REFERENCE TO RELATED APPLICATION

This application claims priority to and the benefit of Korean Patent Application No. 10-2017-0166340, filed on Dec. 6, 2017 which is incorporated herein by reference in its entirety.

FIELD

The present disclosure relates to an upshift control method for the shifting of a dual clutch transmission (DCT).

BACKGROUND

The statements in this section merely provide background information related to the present disclosure and may not constitute prior art.

In a vehicle equipped with a DCT, engine torque is transferred to drive wheels via gear shifting utilizing two clutches. The two clutches are connected to respective input shafts within the DCT so as to realize shift stages assigned to the respective input shafts. The shift stages assigned to the two input shafts are generally divided into odd-numbered stages and even-numbered stages such that any one input shaft may realize only odd-numbered stages and the other input shaft may realize only even-numbered stages.

Power-on upshift is shifting to a higher shift stage among a series of shift stages in the state in which a driver depresses an accelerator pedal. In the case of a DCT, upshifting during traveling is shifting from an N stage, which is a shift stage assigned to one input shaft, to an N+1 stage, which is a shift stage assigned to the other input shaft.

At this time, a clutch, which is connected to the input shaft realizing the N stage as a current shift stage, is disengaged, and reduced engine torque must be input thereto. A clutch, which is connected to the input shaft realizing the N+1 stage as a target shift stage, is engaged, and increased engine torque must be input thereto.

Upon shifting, the clutch, which is disengaged for the input of reduced engine torque thereto, is referred to as a "disengaging clutch", and the input shaft connected thereto is referred to as a "disengaging input shaft". The clutch, which is engaged for the input of increased engine torque thereto, is referred to as an "engaging clutch", and the input shaft connected thereto is referred to as an "engaging input shaft" or a "target shift-stage input shaft".

When the driver depresses the accelerator pedal during power-on upshifting, the engine torque increases in response to a driver accelerator pedal depression amount. At this time, if an engaging clutch torque does not increase as the engine torque increases, a flare phenomenon may occur. The flare phenomenon occurs when the increase in the engaging clutch torque does not match with the increase in the engine torque and thus an engine speed is not synchronized with a target shift-stage input shaft speed. Therefore, control is performed to increase the engaging clutch torque in response to an increase in engine torque.

However, we have discovered that the control of simply increasing the engaging clutch torque in response to an increase in engine torque causes excessive change to engine angular acceleration so that shocks at the end of shifting occurs.

Details described as the background art are intended merely for the purpose of promoting the understanding of the background of the present disclosure and should not be construed as an acknowledgment of the prior art that is not known to those of ordinary skill in the art.

SUMMARY

The present disclosure is devised to solve the problems with the related art described above, and the present disclosure provides an upshift control method for a DCT vehicle, which inhibits or prevents a flare phenomenon in which an engine speed is not synchronized with a target shift-stage input shaft speed during power-on upshifting. In one form of the present disclosure, by appropriately controlling the engine speed so as not to be excessively rapidly synchronized with the target shift-stage input shaft speed, the occurrence of shocks at the end of shifting is inhibited or prevented and thus smooth and rapid shifting is accomplished.

In accordance with an aspect of the present disclosure, an upshift control method for a DCT vehicle may include the steps of: determining, by a controller, whether or not an inertia phase begins when an accelerator pedal depression amount increases during power-on upshifting; calculating, by the controller, a first control amount corresponding to a first final clutch torque for controlling an engaging clutch when the inner phase begins, in consideration of a difference between a current acceleration amount (namely, a current accelerator pedal depression amount) and an inertia phase acceleration (namely, an accelerator pedal depression amount at beginning of the inertia phase), a difference between the current acceleration amount and a maximum inertia phase acceleration (namely, a maximum value of an accelerator pedal depression amount) during the inertia phase, and a target engine torque; and controlling, by the controller, the engaging clutch with the first final clutch torque calculated in the calculating step.

The method may further include determining, by the controller, whether or not a current shifting progress rate is equal to or greater than a predetermined reference value after the determining step and before the calculating step, and when the current shifting progress rate is equal to or greater than the predetermined reference value, calculating, by the controller, a second control amount including a second final clutch torque for controlling the engaging clutch. The second final clutch torque is calculated based on a slip change rate corresponding to a difference between an engine speed and a target shift-stage input shaft speed, in addition to factors considered in calculating the first final clutch torque, and controlling the engaging clutch using the second final clutch torque calculated in the step of calculating the second control amount.

In the calculating the first control amount, the first final clutch torque may be determined by an equation:
Final Clutch Torque(t)=Final Clutch Torque(t−1)+f{Target Clutch−Final Clutch Torque(t−1), Difference between Current Accelerator Pedal Depression Amount and Maximum Value of Accelerator Pedal Depression Amount during Elapsed Inertia Phase}
where,
Target Clutch Torque=Target Engine Torque−Gap Torque+ f(Target Engine Torque, Difference between Current Accelerator Pedal Depression Amount and Accelerator Pedal Depression Amount at beginning of inertia phase), and
Gap Torque=Difference between Target Engine Torque and Engaging Clutch Torque upon completion of torque phase In calculating the second control amount, the second final clutch torque may be determined by an equation:

Final Clutch Torque(t)=Final Clutch Torque(t−1)+f{Target Clutch Torque−Final Clutch Torque(t−1), Difference between Current Accelerator Pedal Depression Amount and Maximum Value of Accelerator Pedal Depression Amount during Elapsed Inertia Phase} where,

Target Clutch Torque=Target Engine Torque−Gap Torque+f(Target Engine Torque, Difference between Current Accelerator Pedal Depression Amount and Accelerator Pedal Depression Amount at beginning of inertia phase)+Slip Change Rate Compensation Torque, Gap Torque=Difference between Target Engine Torque and Engaging Clutch Torque upon completion of torque phase, Slip Chage Rate Compensation Torque =
$$Je * \left[ \frac{dNi}{dt} + \left( \frac{dSlip_{target}}{dt} - \frac{dSlip_{actual}}{dt} \right) \right]$$

where, Je: Engine Rotational Inertial Moment
Ni: Engaging Input Shaft Speed (Number of Revolutions)
Slip: Engine Speed−Target Shift-stage Input Shaft Speed (=Engaging Input Shaft Speed)
$Slip_{target}$: Target Slip
$Slip_{actual}$: Actual Slip (=Measured Slip)

The controller may end shifting when slip is equal to or less than a predetermined reference slip amount while performing the controlling.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
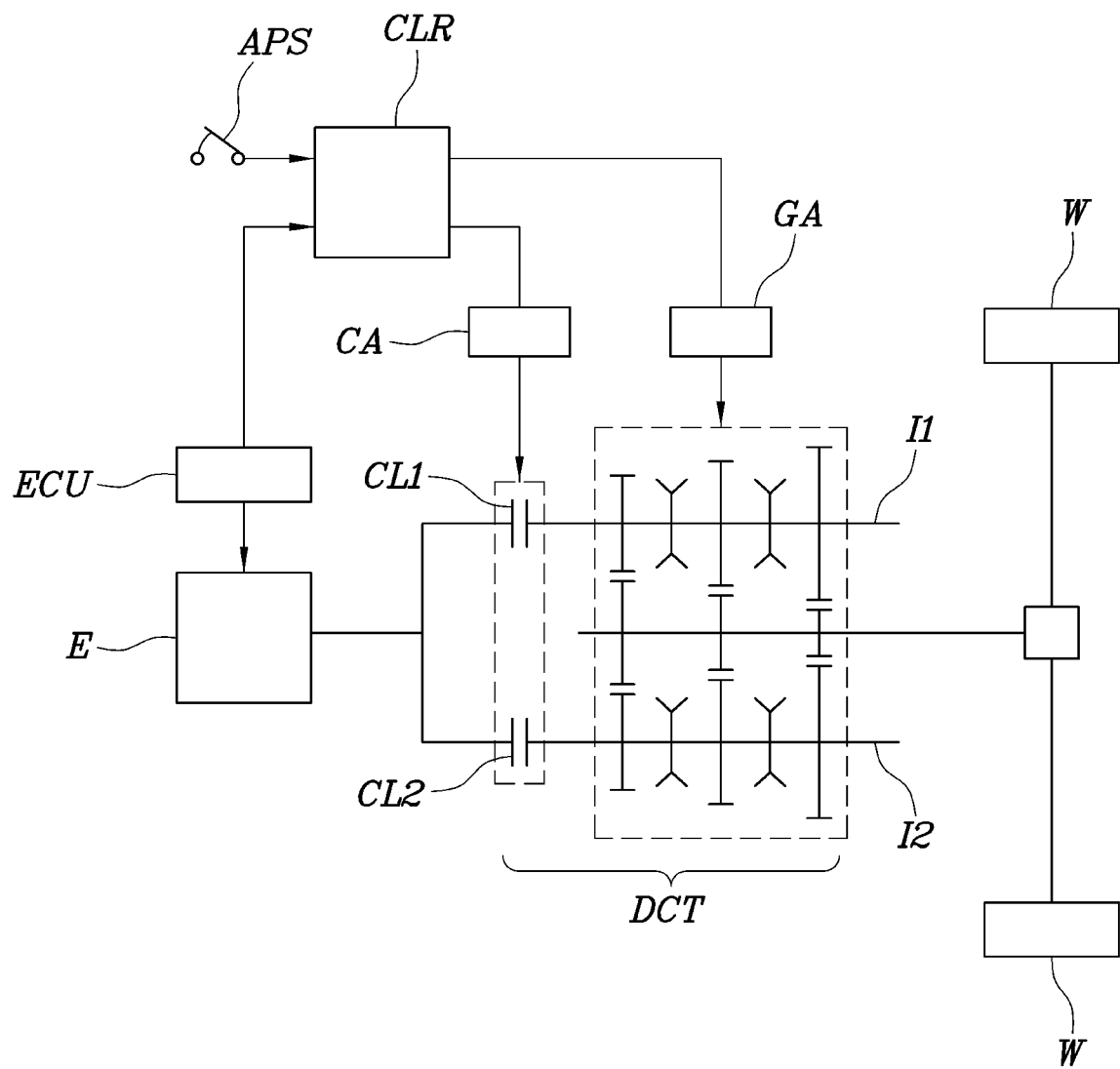
FIG. 1 is a view illustrating the configuration of a DCT vehicle to which the present disclosure may be applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, in a DCT vehicle, the power of an engine E is selectively applied to two input shafts I1 and I2 via two clutches CL1 and CL2 of a dual clutch transmission (DCT). After shifting in the DCT, the power is applied to drive wheels W.

A controller CLR is connected to an engine control unit (ECU) to receive information such as an engine torque and request, for example, a reduction in torque to the engine E. The controller CLR is also connected so as to control a clutch actuator CA, which controls the two clutches CL1 and CL2 of the DCT, and a gear actuator Ga, which changes the gear engagement of the DCT.

The controller CLR is configured to receive a signal from an accelerator pedal sensor (APS) and to receive the rotational speed or the like of the respective input shafts I1 and I2 of the DCT.

The two clutches CL1 and CL2 may include one thereof, which realizes a current shift stage, and the other one thereof, which realizes a new target shift stage, upon shifting. In the following description, the clutch that realizes the current shift stage but needs to be disengaged due to the progress of shifting is referred to as a "disengaging clutch", and the clutch that is gradually engaged in order to realize the target shift stage is referred to as an "engaging clutch".

In addition, based on the classification of the clutches described above, the input shaft to which the disengaging clutch is connected is referred to as a "disengaging input shaft", and the input shaft to which the engaging clutch is connected is referred to as an "engaging input shaft".

In addition, in the following description, "target shift-stage input shaft speed" means the rotational speed of the input shaft, which is used to realize a target shift stage when a gear of the target shift stage is engaged. The controller CLR may be implemented by at least one processor operated by a setting program, in which the setting program includes a series of commands for performing each step included in the upshift control method according to the present disclosure to be described below.

Figure 2:
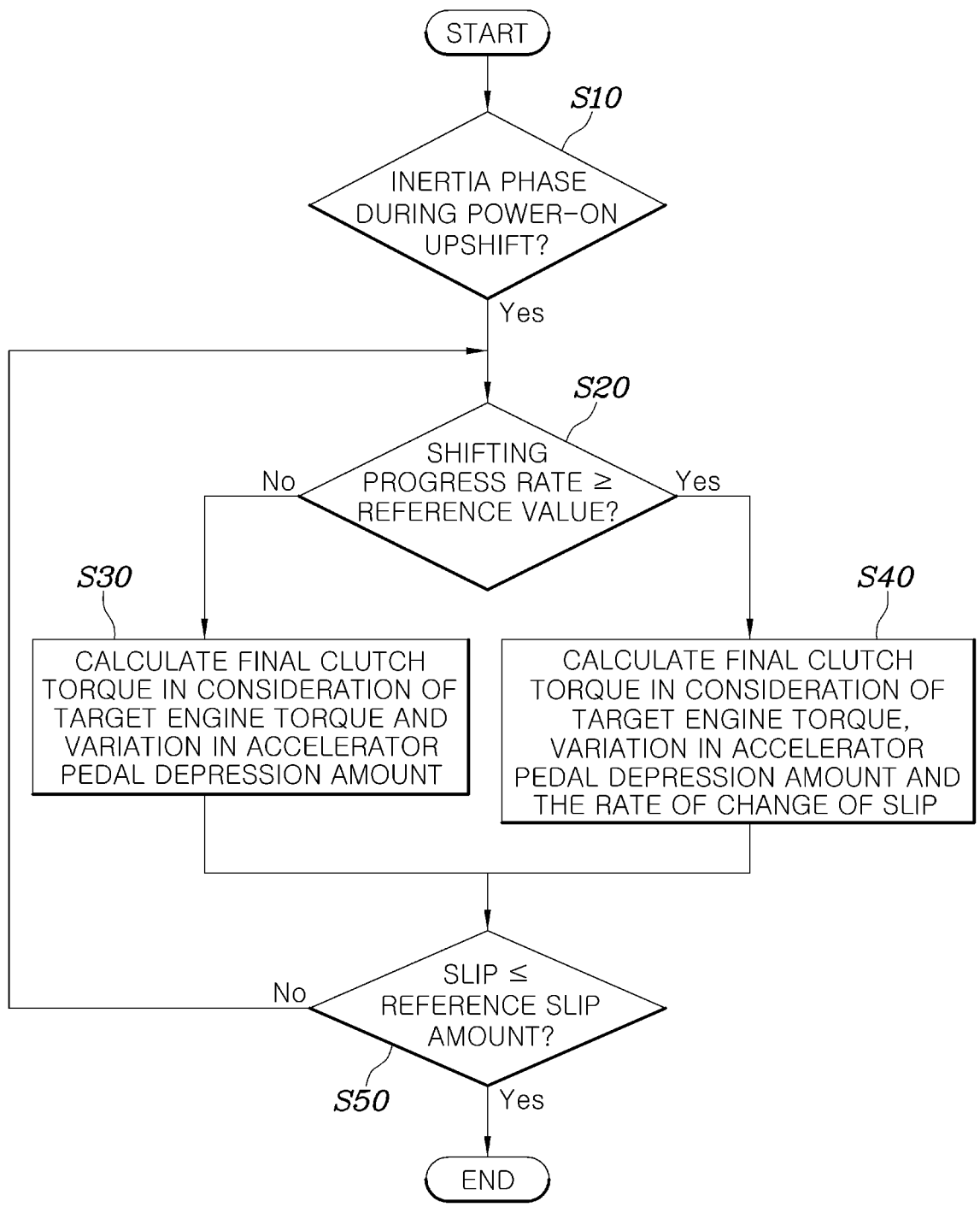
FIG. 2 is a flowchart explaining one form of an upshift control method for a DCT vehicle in one form of the present disclosure.

Referring to FIG. 2, in one form of the present disclosure, an upshift control method for a DCT vehicle includes a shifting situation determination step S10 of determining, by the controller CLR, whether or not an inertia phase begins when the driver accelerator pedal depression amount increases during power-on upshifting, a first control amount calculation step S30 of calculating, by the controller CLR, a first final clutch torque for controlling the engaging clutch when the inner phase begins, and a clutch control step S50 of controlling, by the controller CLR, the engaging clutch using the first final clutch torque calculated in the first control amount calculation step S30. In particular, in the first control amount calculation step S30, the controller CLR calculates the first final clutch torque based on several factors, for example, the difference between the current accelerator pedal depression amount (i.e., current acceleration amount) and the accelerator pedal depression amount at the beginning of the inertia phase(i.e., inertia phase acceleration), the difference between the current accelerator pedal depression amount and the maximum value of the accelerator pedal depression amount (a maximum inertia phase acceleration) during the inertia phase elapsed until a present time, and a target engine torque.

That is, when an inertia phase begins after a torque phase at the time at which the driver accelerator pedal depression amount increases during power-on upshifting, the controller CLR calculates the final clutch torque in consideration of variation in the accelerator pedal depression amount, and controls the engaging clutch using the calculated final clutch torque. Thereby, it is possible to inhibit or prevent the flare phenomenon described above and to appropriately control the engine speed so as to be not excessively rapidly synchronized with the target shift-stage input shaft speed, which may reduce or prevent shocks at the end of shifting and secure smooth and rapid shifting sensation.

The controller CLR may determine whether or not a current shifting progress rate is equal to or greater than a predetermined reference value (S20), after the shifting situation determination step S10 and before the first control amount calculation step S30. When the progress rate is equal to or greater than the predetermined reference value, the controller CLR performs a second control amount calculation step S40 of calculating the final clutch torque for controlling the engaging clutch in consideration of the rate of change of slip, which is the difference between the engine speed and the target shift-stage input shaft speed, in addition to factors considered in the first control amount calculation step S30.

The clutch control step S50 is performed based on the final clutch torque calculated in the second control amount calculation step S40.

That is, even when it is determined by the shifting situation determination step S10 that the inertia phase has begun and the driver accelerator pedal depression amount has increased, the controller CLR determines whether or not the progress rate of the entire shifting operation including the torque phase and the inertia phase is equal to or greater than the reference value, and controls the engaging clutch in further consideration of the rate of change of slip when the progress rate is equal to or greater than the reference value.

For reference, the entire shifting operation includes the torque phase and the inertia phase. The torque phase is a process in which the torque of a clutch, which realizes a current shift stage, is gradually reduced to disengage the clutch and the torque of a clutch, which realizes a target shift stage, is gradually increased to engage the clutch, without variation in engine speed for shifting. The inertia phase is a process in which the engine speed substantially varies to the target shift-stage input shaft speed so as to be synchronized therewith after the torque phase.

The reference value may be set, for example, to about 70%. Such a reference value is determined in consideration of the point in time at which shifting needs to be almost finished, that is, the point in time at which slip begins to be controlled so as to be positively reduced in order to finish shifting, and may be appropriately changed based on the purpose thereof.

In the first control amount calculation step S30, the first final clutch torque is determined by the following equation;
Final Clutch Torque(t)=Final Clutch Torque(t−1)+f{Target Clutch Torque−Final Clutch Torque(t−1), Difference between Current Accelerator Pedal Depression Amount and Maximum Value of Accelerator Pedal Depression Amount during Elapsed Inertia Phase}
where,
Target Clutch Torque=Target Engine Torque−Gap Torque+ f(Target Engine Torque, Difference between Current Accelerator Pedal Depression Amount and Accelerator Pedal Depression Amount at beginning of inertia phase), and
Gap Torque=Difference between Target Engine Torque and Engaging Clutch Torque upon completion of torque phase.

The target engine torque is calculated by the ECU, which controls the engine, as a target torque that the engine needs to output in response to the driver accelerator pedal depression amount, when a request for reduced engine torque, made to the engine control ECU by the DCT controller, is not considered.

Figure 3:
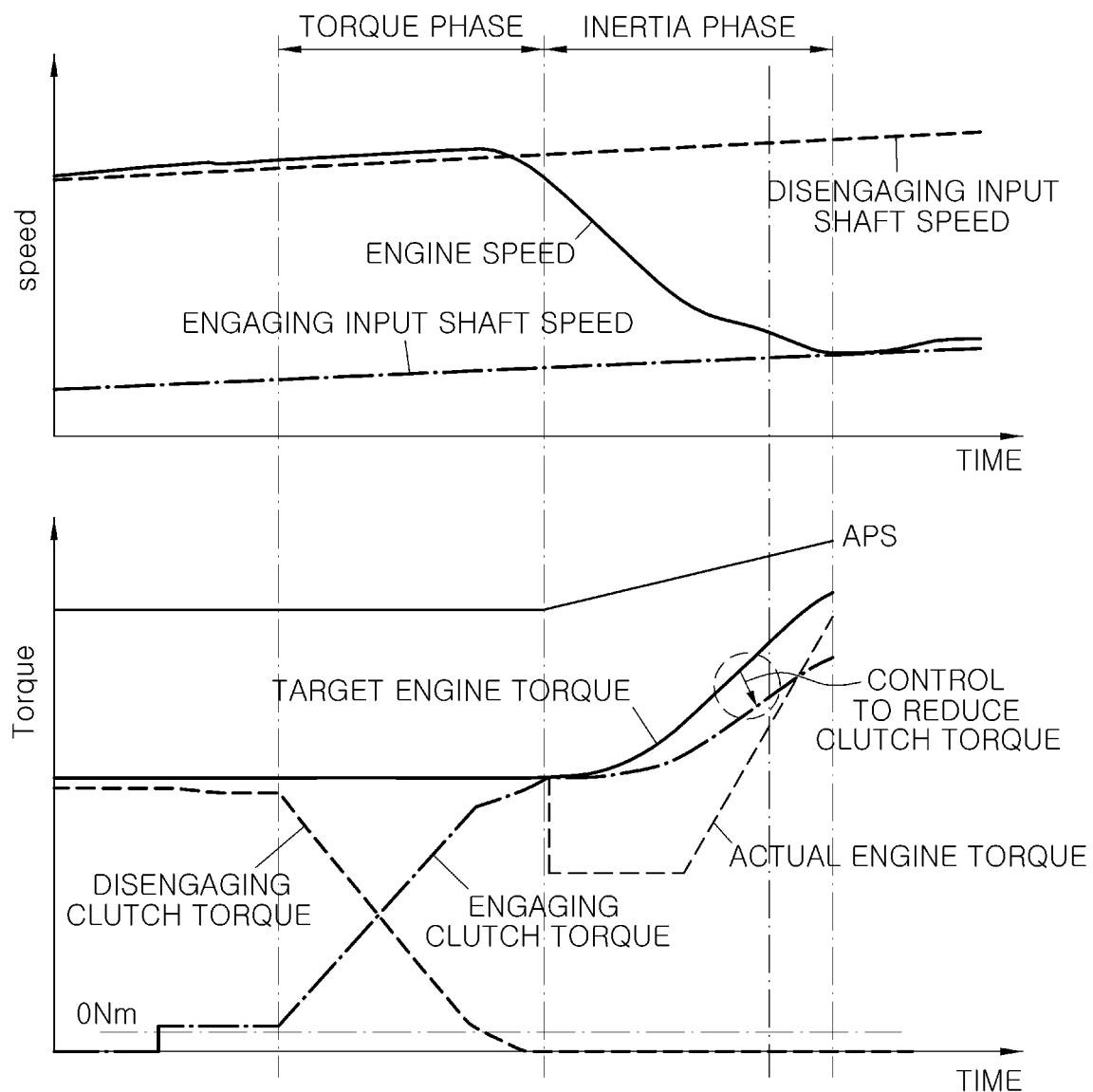
FIG. 3 is a graph explaining the upshift control method for the DCT vehicle in one form of present disclosure.

For reference, in FIG. 3, an actual engine torque in the inertia phase is lower than the target engine torque because the DCT controller makes a request for reduced engine torque to the ECU so that the engine actually outputs a reduced torque, thus reducing the engine speed.

The target clutch torque is obtained by subtracting a predetermined gap torque from the target engine torque and adding thereto a value, which is determined from the function or the map having independent variables such as the target engine torque and the difference between the current accelerator pedal depression amount and the accelerator pedal depression amount at the beginning of the inertia phase. Basically, the engaging clutch torque is controlled so that the difference from the target engine torque is the predetermined gap torque, and varies depending on how much the current accelerator pedal depression amount is increased relative to the accelerator pedal depression amount at the beginning of the inertia phase.

Here, the value calculated using a function or based on a map becomes smaller as the target engine torque is larger and the difference between the current accelerator pedal depression amount and the accelerator pedal depression amount at the beginning of the inertia phase is larger. Consequently, the target clutch torque becomes smaller.

By using the target clutch torque obtained as described above, the final clutch torque, which is used when controlling the engaging clutch, is obtained.

The final clutch torque t at a current control cycle of the controller is based on the final clutch torque t−1 at a previous control cycle, and is also based on values obtained using a function or based on a map having independent variables such as the difference between the target clutch torque and the final clutch torque t−1 at the previous control cycle and the difference between the current accelerator pedal depression amount and the maximum value of the accelerator pedal depression amount during the elapsed inertia phase.

Thus, the final clutch torque gradually varies from the final clutch torque at the previous control cycle based on a value determined using the function or based on the map. The value determined using the function or based on the map becomes smaller as the difference between the target clutch torque and the final clutch torque t−1 at the previous control cycle is larger and the difference between the current accelerator pedal depression amount and the maximum value of the accelerator pedal depression amount during the elapsed inertia phase is smaller.

That is, the final clutch torque becomes smaller as the difference between the target clutch torque and the final clutch torque t−1 at the previous control cycle is larger and the difference between the current accelerator pedal depression amount and the maximum value of the accelerator pedal depression amount during the elapsed inertia phase is smaller.

Conventionally, because the engaging clutch torque is simply controlled to be different from the target engine torque by the gap torque, the engaging clutch torque rapidly increases in the event of rapid variation in target engine torque, causing shocks due to excessive variation in engine speed. However, in the present disclosure, as described above, the engaging clutch torque is controlled so as to be reduced depending on variation in accelerator pedal depression amount while basically having the difference corresponding to the gap torque relative to the target engine torque, which may reduce or prevent shifting shocks and realize rapid synchronization to realize smooth and rapid shifting sensation.

Meanwhile, in the second control amount calculation step S40, the second final clutch torque is determined by the following equation;

Final Clutch Torque(t)=Final Clutch Torque(t−1)+f{Target Clutch Torque−Final Clutch Torque(t−1), Difference between Current Accelerator Pedal Depression Amount and Maximum Value of Accelerator Pedal Depression Amount during Elapsed Inertia Phase} where,

Target Clutch Torque=Target Engine Torque−Gap Torque+f(Target Engine Torque, Difference between Current Accelerator Pedal Depression Amount and Accelerator Pedal Depression Amount at beginning of inertia phase)+Slip Change Rate Compensation Torque, Gap Torque=Difference between Target Engine Torque and Engaging Clutch Torque upon completion of torque phase, Slip Chage Rate Compensation Torque =

$$Je * \left[ \frac{dNi}{dt} + \left( \frac{dSlip_{target}}{dt} - \frac{dSlip_{actual}}{dt} \right) \right]$$

here, Je: Engine Rotational Inertial Moment
Ni: Engaging Input Shaft Speed (Number of Revolutions)
Slip: Engine Speed−Target Shift-stage Input Shaft Speed (=Engaging Input Shaft Speed)
$Slip_{target}$: Target Slip
$Slip_{actual}$: Actual Slip (=Measured Slip)

That is, in the second control amount calculation step S40, the final clutch torque is calculated using the same method as the first control amount calculation step S30, but is calculated in further consideration of the rate of change of slip, which is the difference between the engine speed and the target shift-stage input shaft speed.

The slip change rate compensation torque is used to feed back the difference between a rate of change of target slip and a rate of change of actual slip whenever the control cycle of the controller is repeated, and consequently, to control the engaging clutch torque so as to reduce slip.

While performing the clutch control step S50, the controller ends shifting when slip is equal to or less than a predetermined reference slip amount. The reference slip amount is set, for example, to about 50 RPM. Thereby, the controller determines that the engine speed is almost completely synchronized with the target shift-stage input shaft speed and shifting is completed, and ends a control operation when determining the completion of shifting.

In the exemplary forms of the present disclosure, when an engine torque varies depending on the driver accelerator pedal depression amount during power-on upshifting, there occurs no flare phenomenon in which an engine speed increases, rather than being synchronized with a target shift-stage input shaft speed, and the engine speed may be appropriately controlled so as not to be excessively rapidly synchronized with the target shift-stage input shaft speed. Thereby, it is possible to inhibit or prevent the occurrence of shocks at the end of shifting and secure smooth and rapid shifting sensation.

Although the exemplary forms of the present disclosure have been described above with reference to the accompanying drawings, those skilled in the art will appreciate that the present disclosure can be implemented in various other forms without changing the technical ideas or features thereof.

What is claimed is:

1. An upshift control method for a dual clutch transmission (DCT) in a vehicle, the method comprising the steps of:
determining, by a controller, whether or not an inertia phase begins when an accelerator pedal depression amount increases during power-on upshifting;
calculating, by the controller when the inertia phase begins, a first control amount including a first final clutch torque for an engaging clutch based on a difference between a current acceleration amount and an inertia phase acceleration amount at the beginning of the inertia phase, a difference between the current acceleration amount and a maximum inertia phase acceleration amount during the inertia phase, and a target engine torque; and
controlling, by the controller, the engaging clutch with the first final clutch torque calculated in the calculating step.

2. The method according to claim 1, wherein the current acceleration amount corresponds to a current acceleration pedal depression amount, the inertia phase acceleration amount and the maximum inertia phase acceleration amount correspond to acceleration pedal depression amounts detected at the beginning of the inertia phase and during the inertia phase, respectively.

3. The method according to claim 1, further comprising:
determining, by the controller, whether or not a current shifting progress rate is equal to or greater than a predetermined reference value after the determining step and before the calculating step; and
when the current shifting progress rate is equal to or greater than the predetermined reference value, calculating, by the controller, a second control amount, including a second final clutch torque for the engaging clutch, wherein the second final clutch torque is calculated based on a slip change rate corresponding to a difference between an engine speed and a target shift-stage input shaft speed, and
controlling the engaging clutch using the second final clutch torque.

4. The method according to claim 3, wherein the second final clutch torque is further calculated based the difference between the current acceleration amount and the inertia phase acceleration amount at the beginning of the inertia phase, the difference between the current acceleration amount and the maximum inertia phase acceleration amount during the inertia phase, and the target engine torque, which are used in calculating the first final clutch torque.

5. The method according to claim 3, wherein the first final clutch torque is calculated as:
Final Clutch Torque(t)=Final Clutch Torque(t−1)+f{Target Clutch Torque−Final Clutch Torque(t−1), Difference between Current Accelerator Pedal Depression Amount and Maximum Value of Accelerator Pedal Depression Amount during Elapsed Inertia Phase}
where,
Target Clutch Torque=Target Engine Torque−Gap Torque+f(Target Engine Torque, Difference between Current Accelerator Pedal Depression Amount and Accelerator Pedal Depression Amount at beginning of inertia phase), and
Gap Torque=Difference between Target Engine Torque and Engaging Clutch Torque upon completion of torque phase.

6. The method according to claim 3, wherein the second final clutch torque is calculated as:
Final Clutch Torque(t)=Final Clutch Torque(t−1)+f{Target Clutch Torque−Final Clutch Torque(t−1), Difference between Current Accelerator Pedal Depression Amount and Maximum Value of Accelerator Pedal Depression Amount during Elapsed Inertia Phase}
where,
Target Clutch Torque=Target Engine Torque−Gap Torque+f(Target Engine Torque, Difference between Current Accelerator Pedal Depression Amount and Accelerator Pedal Depression Amount at beginning of inertia phase)+Slip Change Rate Compensation Torque,
where, Gap Torque is difference between Target Engine Torque and Engaging Clutch Torque upon completion of torque phase, and Slip Chage Rate Compensation Torque =
$$Je * \left[ \frac{dNi}{dt} + \left( \frac{dSlip_{target}}{dt} - \frac{dSlip_{actual}}{dt} \right) \right]$$

where, Je is Engine Rotational Inertial Moment,
Ni is Engaging Input Shaft Speed (Number of Revolutions),
Slip is difference between Engine Speed and Target Shift-stage Input Shaft Speed (=Engaging Input Shaft Speed), $Slip_{target}$ is Target Slip, and
$Slip_{actual}$ is Actual Slip (=Measured Slip).

7. The method according to claim 1, wherein the controller ends shifting when slip is equal to or less than a predetermined reference slip amount while performing the controlling step.

* * * * *